United States Patent [19]

Thornton et al.

[11] Patent Number: 4,643,866
[45] Date of Patent: Feb. 17, 1987

[54] NUCLEAR FUEL PELLET-CLADDING INTERACTION TEST DEVICE AND METHOD MODELING IN-CORE REACTOR THERMAL CONDITIONS

[75] Inventors: Thomas A. Thornton, Lynchburg; William G. Pettus, Monroe, both of Va.

[73] Assignee: The Babcock & Wilcox Company, New Orleans, La.

[21] Appl. No.: 526,172

[22] Filed: Aug. 24, 1983

[51] Int. Cl.$^4$ .............................................. G21C 17/00
[52] U.S. Cl. ................................... 376/245; 376/251; 376/253
[58] Field of Search ................ 376/245, 247, 251–253; 324/5, 14

[56] References Cited

U.S. PATENT DOCUMENTS

| | | | |
|---|---|---|---|
| 2,656,256 | 10/1953 | Yeater | 374/5 |
| 3,419,467 | 12/1968 | Holzer | 376/253 |
| 3,916,670 | 11/1975 | Davis et al. | 374/14 |
| 3,945,245 | 3/1976 | Stehle et al. | 374/5 |
| 3,988,565 | 10/1976 | Hill | 219/121 R |
| 4,079,620 | 3/1978 | Jester et al. | 376/251 |
| 4,108,719 | 8/1978 | Okhausen | 376/245 |
| 4,225,388 | 9/1980 | Bellaiche et al. | 376/253 |
| 4,485,284 | 11/1984 | Pakulis | 374/14 |

FOREIGN PATENT DOCUMENTS

| | | |
|---|---|---|
| 2019663 | 11/1971 | Fed. Rep. of Germany . |
| 2232821 | 1/1975 | France . |
| 1287516 | 8/1972 | United Kingdom . |
| 1457670 | 12/1976 | United Kingdom . |

OTHER PUBLICATIONS

Nucl. Tech., vol. 58 (7/82) pp. 53–62, "Stimulation of Nuclear Fuel Rods by Electrically Heated Rods" Malang et al.

Journal of American Ceramic Society, vol. 50, No. 9 (9/21/67) pp. 449–453, Kerr, "Thermal Stimulation of In-Reactor Microstructures in $ThO_2$–$UO_2$.

Primary Examiner—Salvatore Cangialosi
Attorney, Agent, or Firm—Robert J. Edwards; Kenneth W. Iles

[57] ABSTRACT

A method and apparatus for testing characteristics of nuclear fuel pellet interaction with nuclear reactor fuel rod cladding whereby the temperature profile within a nuclear fuel rod is more closely modeled in the test device than in the prior art discloses the use of high frequency microwave radiation to heat the fuel pellets within the cladding and using the cladding itself as a waveguide. Sensors monitor various operating parameters and a water jacket cools the test cladding.

24 Claims, 7 Drawing Figures

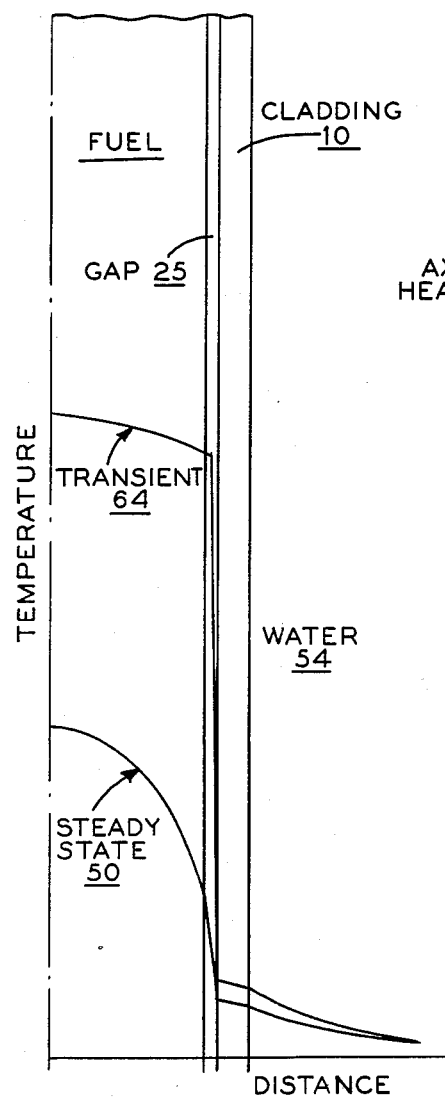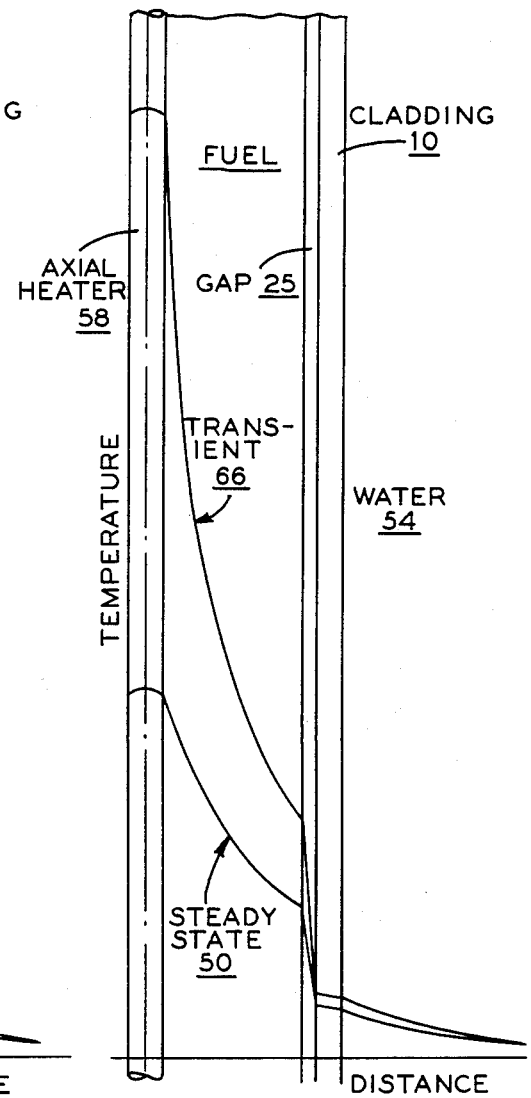

NUCLEAR FUEL PELLET-CLADDING INTERACTION TEST DEVICE AND METHOD MODELING IN-CORE REACTOR THERMAL CONDITIONS

BACKGROUND OF THE INVENTION

1. Field of the Invention

The present invention is directed to a test device for testing the physical reactions of nuclear fuel pellets and the interaction of nuclear fuel pellets with nuclear fuel rod cladding. More particularly, the present invention is directed to a test device which models the thermal conditions existing within an operating nuclear fuel reactor.

2. The Prior Art

In commercial water-cooled nuclear reactors used for central station electric power production, the fuel is based on urania which is sheathed or clad with zirconium alloys such as Zircaloy. Experience in the nuclear industry with fuel rod of Zircaloy-clad urania has indicated several causes for fuel rod failure. Most of these causes have been corrected by improvements in fuel design specifications and improvements in the manufacturing processes. There persists one class of fuel rod failures which has yet to be eliminated and which appears to be of a fundamental nature. These failures are caused by the direct interaction between the irradiated urania fuel, including its inventory of fission products, and the Zircaloy fuel sheath, or cladding. This phenomenon has been called "fuel/cladding interaction" or fuel "pellet-cladding interaction" (PCI). The incidence of such failures is closely linked to the power history of the fuel rod and to the severity and duration of power changes. Pellet-cladding interaction fuel rod failures have occurred in both Boiling Water Reactors (BWR) and Pressurized Water Reactors (PWR) as well as in Canadian Deuterium Moderated Reactors (CANDU) and Steam Generating Heavy Water Reactors (SGHWR). To ameliorate this situation, reactor operational procedures have been established which minimize the incidence of fuel rod failures by PCI. While the operational procedures have been successful in reducing the incidence of fuel failures, the procedures are inconvenient to reactor operators and are costly in terms of reduced capacity factor for plant operation and thus in reduced electrical output. There is a strong incentive to provide a remedy that would eliminate the need for these operational procedures.

As part of this remedy, it is desirable therefore to test nuclear fuel pellets and the interaction of nuclear fuel pellets with the fuel rod cladding to improve the performance of the fuel, increase the life of the fuel rod, to determine the effects of severe temperature transients on fuel pellets and cladding and so forth. Many such tests cannot be desirably conducted in an operating reactor because variables cannot be satisfactorily controlled, test conditions are too severe, or adequate instrumentation cannot survive. Therefore, it is desirable to have a test device that can model conditions in the core of an operating nuclear reactor.

During operation of a nuclear reactor, the fuel pellets, typically uranium dioxide, and the fuel rod cladding interact in three ways which effect the performance of the fuel and the life of the fuel rod: thermal interaction; chemical interaction, including reaction of decay products with cladding; and radioactive reactions, i.e., radiation damage to fuel pellets and cladding.

The prior art discloses two approaches to the problem of testing and assessing fuel pellet-cladding interaction. First, destructive testing of nuclear fuel rods after they have been in service is known in the art. Such testing cannot, however, be truly experimental since control and independent manipulation of variables is not possible in an operating nuclear reactor. In addition, reaction of fuel rods to extreme conditions that might damage the reactor cannot be tested, since the most important such tests involve the effects of repeated rapid heating, and wide temperature excursions. Additionally, the long term hostile conditions within an operating nuclear reactor do not permit effective instrumentation of such tests.

Second, tests have been conducted on a laboratory basis by using a test section of fuel rod having an electrical heating element embedded along the longitudinal axis of the fuel rod test section. Such a device clearly must heat the test sample from the inside to the outside, so that the hotest portion of the test sample is along the axis of the fuel pellet and the coolest portion is the exterior side wall of the fuel rod cladding. This "inside-out" temperature profile is quite different from the more nearly uniform temperature profile produced in fuel rods of an operating nuclear reactor. Test results from this apparatus are not as reliable as desired because the test apparatus cannot model actual reactor conditions closely, particularly when examining the effects of temperature transients involving wide temperature excursions. Currently, the prior art has no ability to model the in-core temperature profile. This failing has been identified as a major problem in fuel performance testing (see, e.g., "Simulation of Nuclear Fuel Rods by Electrically Heated Rods", S. Malang, K. Rust, Nuclear Technology, Vol. 58, July 1982, pages 53–62).

Therefore, a need exists for a method and apparatus for testing pellet-cladding interactions on a small scale in a laboratory before a particular combination of fuel pellets and fuel rods is placed into service.

SUMMARY OF THE INVENTION

Accordingly, it is a primary object of the invention to provide a test apparatus overcoming these and other deficiencies of the prior art.

More particularly, it is an object of the present invention to provide a test apparatus wherein thermal interactions of nuclear fuel pellets and nuclear fuel rod cladding can be observed under realistic conditions without the necessity of actually operating a nuclear reactor.

It is a further object of the present invention to provide a test device in which the temperature profile of fuel pellets and fuel rod cladding is very similar to that found inside of the fuel rods of an operating nuclear reactor.

It is a further object of the present invention to provide a novel method of testing pellet and cladding interaction.

It is a further object of the invention to provide a test apparatus that permits accurate testing of the effects of thermal transients and repeated thermal transients on fuel pellets, fuel rod cladding and their interactions in their actual in service configuration.

Accordingly, the present invention provides a method of testing pellet-cladding interaction comprising: inserting a plurality of fuel pellets into a length of fuel rod cladding, connecting a source of microwave radiation to the fuel rod cladding, generating microwave radiation in the microwave source, guiding the microwave radiation through a waveguide into the fuel pellets to heat the fuel pellets with a temperature profile analogous to that occurring in a nuclear reactor, and monitoring the resulting pellet-cladding interactions. Furthermore, the invention includes an apparatus for testing pellet-cladding interaction comprising: a length of fuel rod cladding, a plurality of nuclear fuel pellets inserted into the cladding, means for cooling the fuel rod cladding attached to the fuel rod cladding, means for guiding microwave radiation into one end of the fuel rod cladding, connected to the fuel rod cladding, means for generating microwaves attached to the guiding means, and a reflector attached to the other end of the fuel rod cladding. Another embodiment of the present invention provides an apparatus for testing pellet-cladding interaction comprising: a length of fuel rod cladding on the order 3.5 inches to 12 inches long having an inside diameter on the order of from about 0.25 inches to about 0.55 inches, a plurality of fuel pellets forming a fuel column inserted into the fuel rod cladding, means for cooling the fuel rod cladding attached to the fuel rod cladding, means for guiding microwave radiation into each end of the fuel rod cladding, connected to each end, separate means for generating microwaves comprising gyrotons each producing microwaves having a frequency greater than about 16 GHz with an output power greater than about 18 KW, attached to the respective waveguides.

BRIEF DESCRIPTION OF THE DRAWINGS

FIG. 4 is a graph illustrating the relative temperature profile of a fuel rod test section heated according to the present invention illustrating steady state and transient relative temperature profiles;

FIG. 5 is a graph illustrating the typical relative temperature profile of a fuel rod test section heated by the axial electric resistance technique of the prior art illustrating steady state and transient relative temperature profiles;

DETAILED DESCRIPTION OF THE PREFERRED EMBODIMENT

Figure 1:
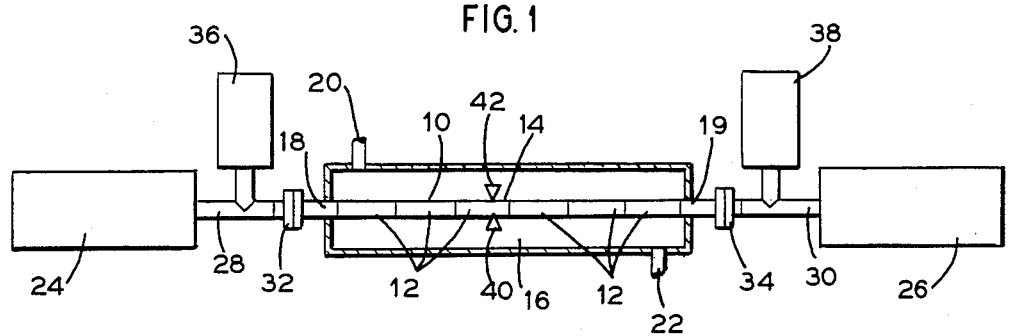
FIG. 1 is a schematic illustrating the components of a preferred embodiment of the present invention having two gyrotrons.

As illustrated in FIG. 1, the present invention includes fuel rod cladding 10, which may be any cladding material usable in a nuclear reactor, which typically is a Zircaloy tube having an inside diameter in a range from about 0.25 inches to about 0.55 inches, depending on the manufacturer. A Zircaloy-4 cladding tube having an inside diameter of 0.38 inches can be used as a waveguide in the electromagnetic microwave frequency range above about 16 GHz, as can be calculated from mathematical equations well known to those skilled in the art. Fuel rod cladding 10 has a preferred length of about 6 inches, but may be on the order of from about 3.5 inches to about 12 inches in length. A plurality of individual fuel pellets 12 comprises fuel column 14 within cladding 10. Fuel pellets 12 may be made of any fissionable material suitable for use as fuel in the core of a nuclear reactor, such as uranium dioxide. Cooling jacket 16, comprising a thermostatically controlled substantially cylindrical water jacket in a preferred embodiment, encloses fuel rod cladding 10, except ends 18, 19 of fuel rod cladding 10. Cooling jacket 16 includes water inlet 20 and water outlet 22. Cooling jacket 16 can dissipate the full power of gyrotons 24, 26 to permit temperature control in the event of 100% susceptance by the target, fuel column 14.

In a preferred embodiment, illustrated in FIG. 1, gyrotrons 24, 26 generate microwave radiation which is conducted through waveguides 28, 30, through windows 32, 34 respectively, which may be of ceramic or other material which is substantially transparent to microwaves, but which permit fuel rod cladding 10 to be substantially sealed at each end 18, 19, thereby enabling the experimenter to control the initial atmosphere within fuel rod cladding 10. Helium is a preferred atmosphere, but this can be changed to simulate changes in the atmosphere inside fuel rod cladding 10 that occur during use. Loads 36, 38, well known in the art, provide a safety valve to absorb and dissipate the full microwave power generated by gyrotrons 24, 26 if target material, i.e., usually fuel column 14 fails to suscept. Waveguides 28, 30 are conventional and well known in the art.

Sensors 40, 42 may comprise thermocouples, in which case they must be located outside fuel rod cladding 10 to prevent impingement by microwaves, which would cause false temperature readings. Preferably, sensors 40, 42 are infrared spectrometer sensors, which require ports through cooling jacket 16, or optical pyrometry sensors, which provide the preferred means for measuring temperature. Sensors 40, 42 may desirably be located at any point along the length of fuel rod cladding 10, although perhaps the point of most nearly uniform volumetric heating is located at the midpoint of the length of fuel rod cladding 10. The departure from uniform volumetric heating throughout fuel rod cladding 10 and fuel column 14, however, is relatively slight since heating is caused by a standing wave in fuel rod cladding 10 and only the extra heat leakage at end 18 and end 19 normally causes departure from uniform volumetric heating. Other sensors for measuring, e.g., heat flux, stress, strain or other parameters of interest may of course be employed. For example, a Youngs Modulus ultrasonic test device can provide data which permit calculation of pellet creep.

Figure 2:
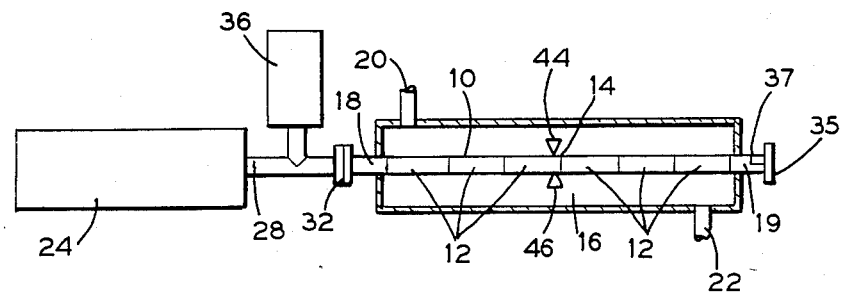
FIG. 2 is a schematic illustrating the components of an alternative embodiment of the present invention, having a single gyrotron.
Figure 3:
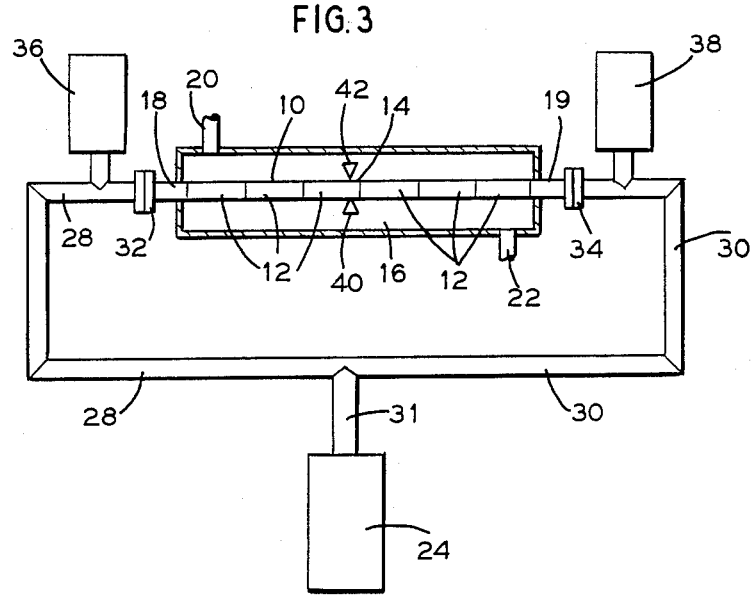
FIG. 3 is a schematic illustrating the components of yet another alternative embodiment of the present invention.

As illustrated in FIG. 2, an alternative preferred embodiment contemplated as the best mode of practicing the invention, employs a single gyrotron 24 which generates microwaves that are conducted through waveguides 28 and window 32 into fuel column 14. In this embodiment, Reflector 35 is the last element on end 19 of fuel rod cladding 10. Reflector 35 reflects microwaves that penetrate fuel column 14 back into fuel column 14, and establishes a standing wave in fuel column 14, thereby providing nearly uniform volumetric heating throughout fuel rod cladding 10 and fuel column 14. Reflector 35 is mounted on adjustment mechanism 37, which may be a threaded screw adjustment mechanism or other adjustment means for adjusting the distance between end 18 and reflector 35 to promote development of a standing wave within fuel rod cladding 10 and vary the deposition of power therein. Reflector 35, which may be made of any conductive metal, is preferably made of copper. The adjustment of reflector 35 is on the order of about 0–1.75 inches. Reflector 35 must also maintain the fluid tight seal of end 19 throughout all stages of adjustment. Construction of such a sealed adjustable reflector is known in the art. In the alternative embodiment illustrated in FIG. 3, the microwave output of a single gyrotron 24 is split into two separate beams by beam splitter 31 by well known technique and is conducted via separate waveguides 28, 30, and through windows 32, 34 respectively into respective ends 18, 19 of fuel rod cladding 10. In all other respects, the embodiment of FIG. 3 conforms to the basic configuration of FIG. 1.

Figure 7:
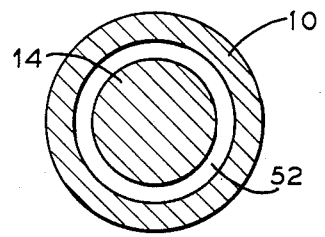
FIG. 7 is a horizontal cross section of a fuel rod.
Figure 6:
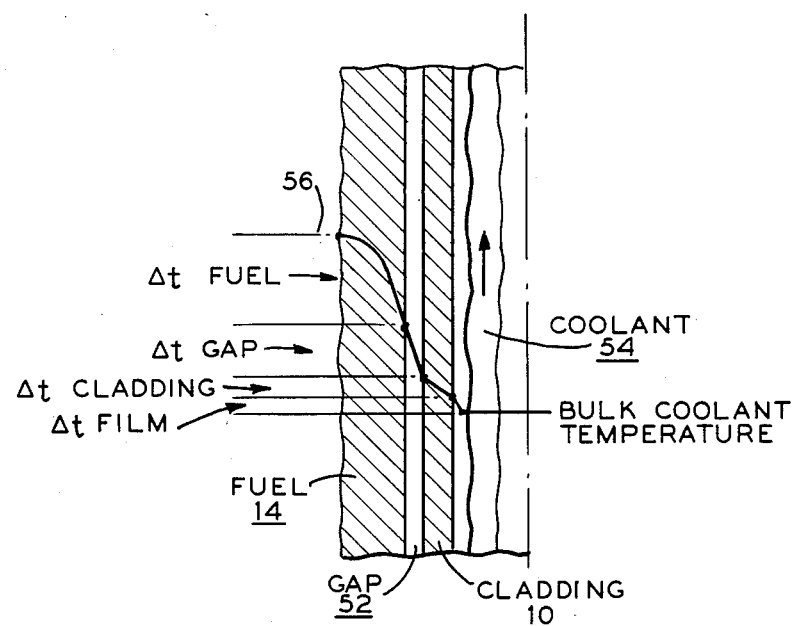
FIG. 6 is a graph illustrating a typical temperature profile of a fuel rod in the core of an operating nuclear reactor.

In operation, the microwave radiation of gyrotrons 24, 26 produces a substantially uniform volumetric heating in fuel column 14, particularly near the midpoint of fuel column 14 because there are only nominal barriers to penetration of fuel pellets 12 by microwaves, which do not rely on conduction to heat fuel pellets 12 but rather upon the natural susceptance of uranium dioxide to microwave radiation. The microwave heating tends to produce a homogeneous temperature throughout the area of uniform volumetric heating. Fuel rod cladding 10 and water in cooling jacket 16, however, cool fuel column 14 by conduction from fuel pellets 12 to cladding 10 to the water. This cooling sequence leads to the relative temperature profile illustrated by steady state curve 50 of FIG. 4. (FIGS. 4, 5, and 6 are graphs having relative temperature on the vertical axis and relative distance from the center of the fuel rod on the horizontal axis. FIG. 7 helps clarify orientation of FIGS. 4, 5, and 6.) As illustrated by steady state curve 50, the temperature profile through a fuel pellet decreases in essentially parabolic fashion through small gap 52 (not shown in FIGS. 1, 2, and 3) between fuel pellet 12 and cladding 10, and becomes more nearly flat through cladding 10 and cooling water 54. Steady state curve 50 closely resembles reactor core steady state curve 56 of FIG. 6, which illustrates the temperature profile of a typical fuel rod in an operating nuclear reactor. By controlling the flow rate, flow volume, temperature, and pressure of cooling water 54 in cooling jacket 16, and the heat produced in fuel column 14 by the microwave radiation, any desired realistic temperature profile can be produced in fuel column 14 and fuel cladding 10.

In the core of an operating nuclear reactor, nuclear fission tends to heat each fuel rod uniformly because nuclear fission has only nominal barriers and consequently fission tends to proceed uniformly throughout the fuel (ignoring the regulating effect of burnable poison rods). Cooling water 54 used for heat transfer, cools the fuel rods primarily through conduction with the fuel rod cladding. Thus the distribution of heating and heat transfer mechanisms of the test apparatus of the present invention and an operating nuclear reactor core are substantially similar.

In contrast, as illustrated in FIG. 5, in the conventional test apparatus axial electrical heater 58, disposed along the longitudinal axis of test cladding 60 through a central longitudinal bore in test fuel pellets (not shown) generates the highest temperature at its surface and the fuel pellets themselves must be heated by conduction from their centers to their perimeters leading to a downwardly convex steady state pellet temperature profile 62 of FIG. 5, which is nearly opposite in shape from steady state curve 50. As illustrated by transient curve 64 of FIG. 4 and electrical transient curve 66, the contrast between temperature profiles produced by the present invention and the prior art test apparatus are even greater when sudden high temperature transients are induced into the fuel column, a condition of great interest which cannot be tested in an operating reactor.

Thus, the temperature profile from the inside of a fuel pellet to the outside of a fuel pellet in an operating nuclear reactor can be substantially duplicated in the test apparatus of the present invention. While the invention has been described with respect to certain preferred embodiments, changes and variations in the embodiments disclosed may occur to those skilled in the art. It is not intended that the invention be limited to the precise embodiments disclosed; rather the scope of the invention should be measured by the claims that follow.

We claim:
1. A method of testing pellet-cladding interaction comprising:
  (1) inserting a plurality of fuel pellets into a length of fuel rod cladding;
  (2) connecting a source of microwave radiation to said fuel rod cladding;
  (3) generating microwave radiation having a frequency greater than about 16 GHz with an output power of greater than about 18 KW in said microwave source;
  (4) guiding said microwave radiation through a waveguide into said fuel pellets to heat said fuel pellets with a temperature profile analogous to that occurring in a nuclear reactor; and
  (5) monitoring the resulting pellet-cladding interactions.
2. The method of claim 1 wherein said waveguide comprises a section of said cladding.
3. The method of claim 1 wherein step 5 further includes monitoring the temperature of said fuel pellets and said fuel rod cladding.
4. The method of claim 1 wherein step 5 further includes monitoring the heat flux within said fuel pellets.
5. The method of claim 1 wherein step 5 further includes monitoring the strain within said fuel pellets.
6. An apparatus for testing pellet-cladding interaction comprising:
  (1) a length of fuel rod cladding;
  (2) a plurality of nuclear fuel pellets inserted into said fuel rod cladding;
  (3) means for cooling said fuel rod cladding attached to said fuel rod cladding;
  (4) means for guiding microwave radiation into one end of said fuel rod cladding, connected to said fuel rod cladding;
  (5) means for generating microwaves attached to said guiding means comprising a gyrotron producing microwaves having a frequency greater than about 16 GHz with an output power of greater than about 18 KW.; and a reflector attached to the other end of said fuel rod cladding.
7. An apparatus according to claim 6 wherein said fuel rod cladding comprises a Zircaloy tube.
8. An apparatus according to claim 7 wherein said tube has an inside diameter in a range of from about 0.25 inches to about 0.55 inches.
9. An apparatus according to claim 7 wherein said tube has a length in the range from about 3.5 inches to about 12 inches.

10. An apparatus according to claim 6 wherein said cooling means comprises a water jacket.

11. An apparatus according to claim 6 wherein said test device further includes one or more temperature sensors distributed within said fuel rod cladding.

12. An apparatus according to claim 6 wherein siad test device further includes one or more heat flux sensors distributed within said fuel rod cladding.

13. An apparatus according to claim 6 wherein said test device further includes one or more strain sensors distributed within said fuel rod cladding.

14. An apparatus according to claim 6 wherein said apparatus further comprises means for adjusting the axial distance of said reflector relative to the opposite end of said fuel rod cladding, said adjustment means being secured to said fuel rod cladding and said reflector.

15. An apparatus for testing pellet-cladding interaction comprising:
  (1) a length of fuel rod cladding;
  (2) a plurality of nuclear fuel pellets inserted into said fuel rod cladding;
  (3) means for cooling said fuel rod cladding attached to said fuel rod cladding;
  (4) means for guiding microwave radiation into each end of said fuel rod cladding; and
  (5) means for generating microwaves attached to said guiding means comprising a gyrotron producing microwaves having a frequency greater than about 16 GHz with an output power of greater than about 18 KW.

16. An apparatus according to claim 15 wherein said fuel rod cladding comprises a Zircaloy tube.

17. An apparatus according to claim 15 wherein said tube has an inside diameter in a range of from about 0.25 inches to about 0.55 inches.

18. An apparatus according to claim 15 wherein said tube has a length in the range from about 3.5 inches to about 12 inches.

19. An apparatus according to claim 15 wherein said cooling means comprises a water jacket.

20. An apparatus according to claim 15 wherein said test device further includes one or more temperature sensors distributed within said fuel rod cladding.

21. An apparatus according to claim 15 wherein said test device further includes one or more heat flux sensors distributed within said fuel rod cladding.

22. An apparatus according to claim 15 wherein said test device further includes one or more strain sensors distributed within said fuel rod cladding.

23. An apparatus according to claim 15 further comprising a separate microwave generator connected to each said microwave guiding means.

24. An apparatus for testing pellet-cladding interaction comprising:
  (1) a length of fuel rod cladding on the order of 3.5 inches to 12 inches long having an inside diameter on the order of from about 0.25 inches to about 0.55 inches;
  (2) a plurality of fuel pellets forming a fuel column inserted into said fuel rod cladding;
  (3) means for cooling said fuel rod cladding attached to said fuel rod cladding;
  (4) means for guiding microwave radiation into each end of said fuel rod cladding, connected to each respective said end;
  (5) separate means for generating microwaves comprising gyrotrons each producing microwaves having a frequency greater than about 16 $GH_z$ with an output power of greater than about 18 KW, attached to said respective waveguides.

* * * * *